(12) United States Patent
Henry et al.

(10) Patent No.: US 11,931,835 B2
(45) Date of Patent: Mar. 19, 2024

(54) WELDING SYSTEM FOR MITIGATING GUN DAMAGE IN PULSED ARC WELDING

(71) Applicant: Lincoln Global, Inc., Santa Fe Springs, CA (US)

(72) Inventors: Judah B. Henry, Painesville, OH (US); Bruce J. Chantry, Solon, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 474 days.

(21) Appl. No.: 16/169,060

(22) Filed: Oct. 24, 2018

(65) Prior Publication Data
US 2020/0130093 A1    Apr. 30, 2020

(51) Int. Cl.
B23K 9/12     (2006.01)
B23K 9/09     (2006.01)
B23K 9/133    (2006.01)

(52) U.S. Cl.
CPC ............ *B23K 9/125* (2013.01); *B23K 9/091* (2013.01); *B23K 9/123* (2013.01); *B23K 9/1336* (2013.01)

(58) Field of Classification Search
CPC ........ B23K 9/125; B23K 9/091; B23K 9/123; B23K 9/1336; B23K 9/09; B23K 9/092; B23K 9/093; B23K 9/124; B23K 9/133; B23K 9/1006; B23K 9/095; B23K 9/073; B23K 9/1062; B23K 9/10; B23K 9/0953; B23K 9/1056; B23K 9/126; B23K 9/127; B23K 9/1031
USPC ............ 219/137.71, 137 R, 130.51, 124.02, 219/124.03, 125.12, 130.21, 130.31, 219/130.33
See application file for complete search history.

(56) References Cited

U.S. PATENT DOCUMENTS

| | | | | |
|---|---|---|---|---|
| 5,990,445 A | * | 11/1999 | Ogasawara | B23K 9/124 |
| | | | | 219/130.5 |
| 6,156,998 A | | 12/2000 | Takahashi et al. | |
| 6,335,511 B1 | * | 1/2002 | Rothermel | B23K 9/091 |
| | | | | 219/124.03 |

(Continued)

FOREIGN PATENT DOCUMENTS

| | | | |
|---|---|---|---|
| EP | 949035 A2 | * 10/1999 | ........... B23K 9/0735 |
| JP | S58-47570 A | 3/1983 | |
| JP | 2016-034658 A | 3/2016 | |

OTHER PUBLICATIONS

Extended European Search Report from Corresponding European Application No. 19204892.4; dated May 20, 2020; pp. 1-6.

*Primary Examiner* — Geoffrey S Evans
(74) *Attorney, Agent, or Firm* — David J. Muzilla (57) ABSTRACT

Embodiments of systems and methods in pulsed arc welding. A robotic welding system, having a welding torch with a contact tip, is configured to perform the following method: (a) generate and output a series of a determined number of welding output pulses as a welding wire electrode is fed toward a workpiece; (b) stop generating welding output pulses while allowing the welding wire electrode to continue to be fed toward the workpiece in an attempt to electrically short to the workpiece; (c) attempt to confirm that the welding wire electrode has electrically shorted to the workpiece within a determined error time period; and (d) repeat steps (a) through (c) if electrical shorting of the welding wire electrode has been confirmed within the determined error time period, else, shut down the robotic welding system to avoid damaging the welding torch.

22 Claims, 4 Drawing Sheets

(56) References Cited

U.S. PATENT DOCUMENTS

| | | |
|---|---|---|
| 7,067,767 B2 | 6/2006 | Hsu |
| 8,035,059 B2 | 10/2011 | Artelsmair |
| 8,049,140 B2 | 11/2011 | Kawamoto et al. |
| 8,809,738 B2 | 8/2014 | Ryan et al. |
| 9,393,635 B2 | 7/2016 | Peters et al. |
| 9,415,457 B2 | 8/2016 | Daniel et al. |
| 9,442,481 B2 | 9/2016 | Davidson et al. |
| 2007/0262065 A1 | 11/2007 | Peters et al. |
| 2014/0001166 A1* | 1/2014 | Peters .................. B23K 9/1006 219/130.1 |
| 2014/0312020 A1* | 10/2014 | Daniel ................. B23K 9/0953 219/124.02 |
| 2015/0108096 A1* | 4/2015 | Daniel ................. B23K 9/0956 219/76.12 |
| 2016/0221105 A1* | 8/2016 | Henry .................... B23K 9/173 |
| 2016/0250708 A1* | 9/2016 | Yashima .............. B23K 9/0953 219/74 |
| 2017/0050258 A1 | 2/2017 | Hillen et al. |

* cited by examiner

WELDING SYSTEM FOR MITIGATING GUN DAMAGE IN PULSED ARC WELDING

CROSS REFERENCE TO RELATED APPLICATIONS/INCORPORATION BY REFERENCE

U.S. Pat. No. 7,067,767, issued on Jun. 27, 2006, is incorporated herein by reference in its entirety.

FIELD

Embodiments of the present invention relate to pulsed arc welding. More particularly, embodiments of the present invention relate to mitigating welding gun/torch damage in pulsed arc welding.

BACKGROUND

During pulsed arc welding operations (especially robotic pulsed arc welding operations) where a consumable welding wire is fed toward a workpiece, the fed wire can sometimes get tangled ("bird nested") within the welding system. Such tangling is more likely to occur in soft wire applications (e.g., aluminum wire applications). The wire stops feeding and melts off all the way up to the contact tip of the welding gun/torch. The contact tip can start melting which ruins the contact tip. Other components of the welding gun/torch (e.g., the diffuser) may experience excessive heating and melting as well.

SUMMARY

Embodiments of the present invention include systems and methods related to pulsed arc welding and mitigating damage to a welding gun or torch due to tangling ("bird nesting") of a consumable welding wire during a pulsed arc welding process. The terms "welding gun", "welding torch", and "welding gun/torch" are used interchangeably herein.

One embodiment includes a pulsed arc welding system. The pulsed arc welding system includes a waveform generator configured to generate a pulsed welding waveform and a power supply configured to generate welding output pulses in response to the pulsed welding waveform. The pulsed arc welding system also includes a wire feeder configured to feed a welding wire electrode toward a workpiece through a welding gun having a contact tip. The pulsed arc welding system further includes a controller configured to control operation of the waveform generator, the power supply, and the wire feeder during a pulsed welding operation. For example, the controller is configured to control operation of the waveform generator, the power supply, and the wire feeder during a pulsed welding operation to: (a) generate and output a series of a determined number of welding output pulses to form an arc between the welding wire electrode and the workpiece as the welding wire electrode is fed toward the workpiece; (b) stop generating welding output pulses after generating and outputting the series of the determined number of welding output pulses while allowing the welding wire electrode to continue to be fed toward the workpiece in an attempt to electrically short to the workpiece; (c) attempt to confirm that the welding wire electrode has electrically shorted to the workpiece within a determined error time period after stopping generation of the welding output pulses; and (d) repeat steps (a) through (c) if electrical shorting of the welding wire electrode has been confirmed within the determined error time period, else, express a system fault and shut down the pulsed arc welding system to avoid damaging the welding gun/torch. In one embodiment, the system includes at least one of a voltage feedback circuit, configured to provide an indication of a welding output voltage to the controller, or a current feedback circuit, configured to provide an indication of a welding output current to the controller. The controller is configured to use at least one of the indication of the welding output voltage or the indication of the welding output current in the attempt to confirm that the welding wire electrode has electrically shorted to the workpiece. In one embodiment, the controller is configured to calculate the determined number of welding output pulses based on a contact tip to work distance (CTWD), a frequency of the determined number of output pulses ($f_{pulse}$), and a wire feed speed (WFS). Also, the controller is configured to calculate the determined error time period based on a contact tip to work distance (CTWD) and a wire feed speed (WFS). In one embodiment, the power supply includes at least a power conversion unit and at least one of an output inverter circuit or an output chopper circuit. The welding wire electrode may be made of at least one of aluminum, copper, or silicon bronze, for example. In one embodiment, the determined number of welding output pulses is in the range of 30 pulses to 40 pulses and the determined error time period is in the range of 120 milliseconds to 1200 milliseconds. In one embodiment, the system includes a robotic subsystem configured to control movement of the welding gun across the workpiece while maintaining a set contact tip to work distance (CTWD). In one embodiment, the controller is configured to control the waveform generator, the power supply, and the wire feeder to generate a short circuit welding output power waveform that is applied to the welding wire electrode and the workpiece after the electrical shorting of the welding wire electrode has been confirmed and before repeating steps (a) through (c). In accordance with one embodiment, the pulsed welding operation includes pulsed phases and short circuit phases. The controller is configured to control a wire feed speed (WFS) of the wire feeder, where the WFS is slower during the short circuit phases than during the pulsed phases. In accordance with one embodiment, the pulsed welding operation includes alternating pulsed phases and short circuit phases. The controller is configured to control the wire feeder to stop feeding of the welding wire electrode during a first time period at the end of the short circuit phases, and increase a wire feed speed (WFS) of the welding wire electrode during a second time period at the end of the pulsed phases.

One embodiment includes a robotic welding system. The robotic welding system includes a robotic subsystem configured to control movement of a welding torch, having a contact tip, across a workpiece while maintaining a set contact tip to work distance (CTWD) during a pulsed welding operation. The robotic welding system also includes a wire feeder configured to feed a welding wire electrode toward the workpiece through the welding torch during the pulsed welding operation. The robotic welding system further includes a welding power source operatively connected to the robotic subsystem and the wire feeder. The welding power source is configured to: (a) generate and output a series of a determined number of welding output pulses to form an arc between the welding wire electrode and the workpiece as the welding wire electrode is fed toward the workpiece during the pulsed welding operation; (b) stop generating welding output pulses after generating and outputting the series of the determined number of welding output pulses while allowing the welding wire electrode to continue to be fed toward the workpiece in an attempt to electrically short to the workpiece during the pulsed welding operation; (c) attempt to confirm that the welding wire electrode has electrically shorted to the workpiece within a determined error time period after stopping generation of the welding output pulses during the pulsed welding operation; and (d) repeat steps (a) through (c) if electrical shorting of the welding wire electrode has been confirmed within the determined error time period, else, express a system fault and shut down the robotic welding system to avoid damaging a welding gun/torch. In one embodiment, the welding power source includes a waveform generator configured to generate a pulsed welding waveform, a power supply configured to generate the determined number of welding output pulses in response to the pulsed welding waveform, and a controller configured to control operation of the waveform generator, the power supply, and the wire feeder during the pulsed welding operation. In one embodiment, the system includes at least one of a voltage sensing configuration to sense a welding output voltage or a current sensing configuration to sense a welding output current. The welding power source is configured to use at least one of an indication of the welding output voltage or an indication of the welding output current in the attempt to confirm that the welding wire electrode has electrically shorted to the workpiece. In one embodiment, at least one of the robotic subsystem, the wire feeder, or the welding power source is configured to calculate the determined number of welding output pulses based on the set contact tip to work distance (CTWD), a frequency of the determined number of output pulses ($f_{pulse}$), and a wire feed speed (WFS). In one embodiment, at least one of the robotic subsystem, the wire feeder, or the welding power source is configured to calculate the determined error time period based on the set contact tip to work distance (CTWD) and a wire feed speed (WFS). The welding wire electrode may be made of at least one of aluminum, copper, or silicon bronze, for example. In one embodiment, the determined number of welding output pulses is in the range of 30 pulses to 40 pulses and the determined error time period is in the range of 120 milliseconds to 1200 milliseconds. In one embodiment, the welding power source is configured to generate a short circuit welding output power waveform that is applied to the welding wire electrode and the workpiece after the electrical shorting of the welding wire electrode has been confirmed and before repeating steps (a) through (c).

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments of systems and methods for mitigating damage to a welding gun or torch due to tangling ("bird nesting") of a consumable welding wire during a pulsed arc welding process are disclosed. For example, one embodiment includes a pulsed arc welding system having a waveform generator configured to generate a pulsed welding waveform and a power supply configured to generate welding output pulses in response to the pulsed welding waveform. The pulsed arc welding system also includes a wire feeder configured to feed a welding wire electrode toward a workpiece through a welding gun having a contact tip. The pulsed arc welding system further includes a controller configured to control operation of the waveform generator, the power supply, and the wire feeder during a pulsed arc welding operation. For example, the controller is configured to control operation of the waveform generator, the power supply, and the wire feeder during a pulsed arc welding operation to: (a) generate and output a series of a determined number of welding output pulses to form an arc between the welding wire electrode and the workpiece as the welding wire electrode is fed toward the workpiece; (b) stop generating welding output pulses after generating and outputting the series of the determined number of welding output pulses while allowing the welding wire electrode to continue to be fed toward the workpiece in an attempt to electrically short to the workpiece; (c) attempt to confirm that the welding wire electrode has electrically shorted to the workpiece within a determined error time period after stopping generation of the welding output pulses; and (d) repeat steps (a) through (c) if electrical shorting of the welding wire electrode has been confirmed within the determined error time period, else, express a system fault and shut down the pulsed arc welding system to avoid damaging the welding gun/torch. The welding wire electrode may be made of various materials. However, welding wire electrodes made of aluminum, copper, or silicon bronze are relatively soft wires that are particularly susceptible to tangling.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates one embodiment of a pulsed arc welding system 100 configured as a robotic welding system.

Figure 1:
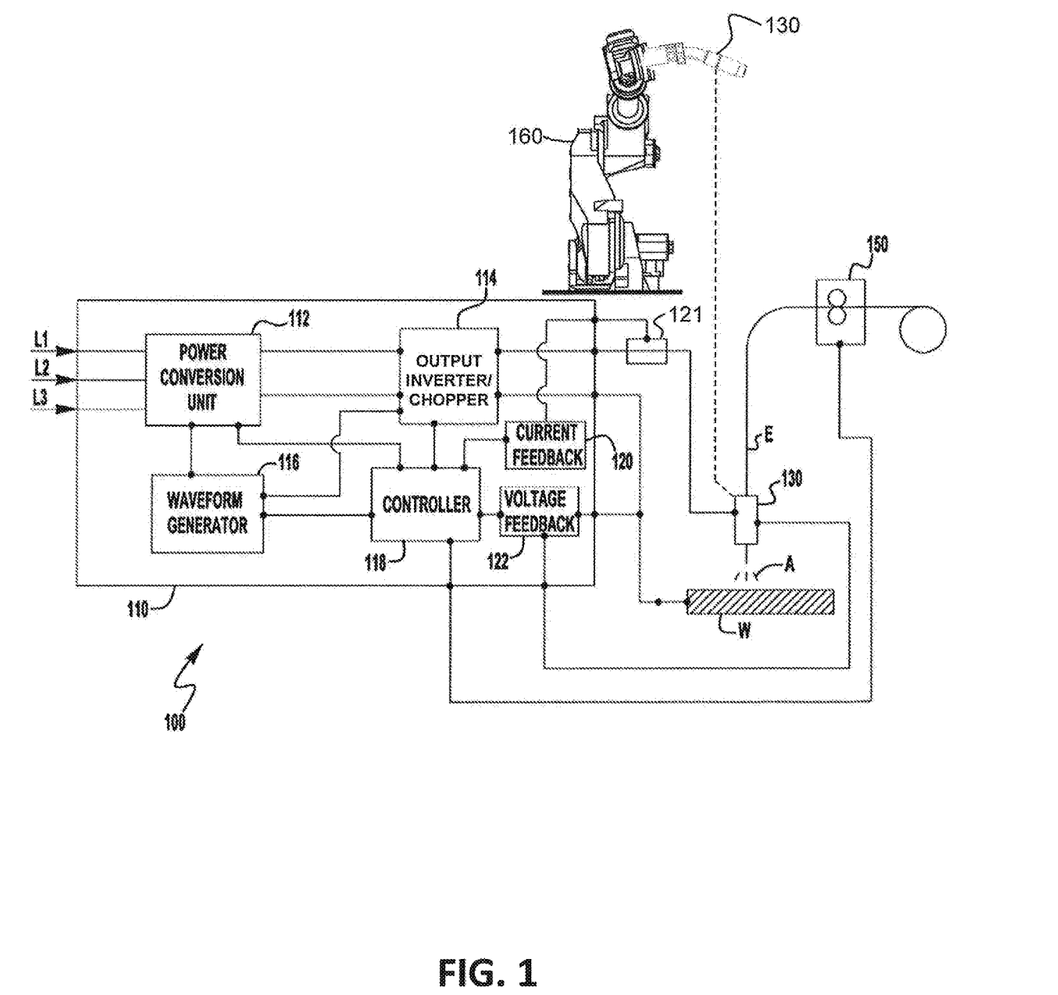
FIG. 1 illustrates one embodiment of a pulsed arc welding system configured as a robotic welding system.

With reference to FIG. 1, the pulsed arc welding system 100 includes a welding power source 110 and a robotic subsystem 160. The welding power source 110 delivers a welding waveform output to a welding gun/torch 130 (positioned by the robotic subsystem 160) and a workpiece W through a welding wire electrode E to generate a welding arc A. The welding wire electrode E is delivered to the welding operation via a wire feeder 150. The wire feeder 150 can be of any known construction such that it is capable of delivering the electrode E to the weld and, in some embodiments, the wire feeder 150 can adjust the wire feed speed of the electrode E based on a signal from the power source 110.

The general construction of the power source 110 can be similar to that of known power sources that are capable of, for example, GMAW/MIG type welding operations, so long as the power source 110 is capable of functioning and operating as described herein. For example, the power source 110 can be constructed similar to that of the Power Wave® type power sources, manufactured by The Lincoln Electric Company, of Cleveland, Ohio. Of course, embodiments of the present invention are not limited to such a construction, and this is intended to be merely exemplary. The general construction of the robotic subsystem 160 can be similar to that of known robotic subsystems that are capable of, for example, guiding a welding gun/torch along a workpiece during a pulsed arc welding operation. In accordance with one embodiment, the robotic subsystem 160 includes a motion controller which controls the movements of a robotic arm which holds the welding gun/torch 130.

As shown in FIG. 1, the power source 110 is configured to receive an input signal through L1, L2 and L3. FIG. 1 depicts a 3-phase input, but other embodiments can utilize a single phase input. The power source 110 includes a power conversion unit 112 which is capable of receiving the input signal and outputting a signal to an output phase (such as an output inverter 114) so that the output of the power source 110 is capable of sustaining a welding arc. The power conversion unit 112 can be made up of a number of different components. For example, it can be comprised of a rectifier circuit and a buck-boost circuit which receives the rectified signal and outputs a constant voltage to the output inverter 114. Of course in other exemplary embodiments, the output inverter 114 can be a chopper, or any other type of output circuit that is capable of working with the power conversion unit 112 to output a welding signal. In accordance with one embodiment, the power conversion unit 112 and the output inverter/chopper 114 together are referred to herein as a welding power supply, or just a power supply.

The power source 110 also includes a waveform generator 116 which is a circuit which aids in controlling the output of at least one, or both, of the power conversion unit 112 and the output inverter 114 to provide the desired welding waveform to be used to generate the arc A. For example, the waveform generator 116 can be used to generate a desired current waveform used to create and maintain the arc A during welding, coupled with one or both of the power conversion unit 112 and the output inverter 114 (or whatever output component is utilized). In addition, the power source 110 has a controller 118 which can be, for example, any type of CPU or processor-type device capable of controlling functions and operations of the power source 110. For example, see the controller 400 of FIG. 4 herein. Other types of controllers are possible as well having, for example, various types of electronic circuitry (e.g., logic circuitry) and memory.

In one embodiment, the controller 118 receives feedback from a current feedback circuit 120 and a voltage feedback circuit 122 which provide current and voltage feedback (respectively) from the welding arc A during a welding operation. With this feedback, the controller 118 is able to adjust and optimize the performance of the power source 110 to provide the desired output. As shown in FIG. 1, in some embodiments, the controller 118 is also coupled to a wire feeder 150 which allows the controller to receive feedback from the wire feeder 150 as well as control the operation of the wire feeder 150, such as wire feed speed, during a welding operation. In accordance with an alternative embodiment, the controller 118 of the power source 110 also serves as a motion controller for the robotic subsystem 160.

Figure 2:
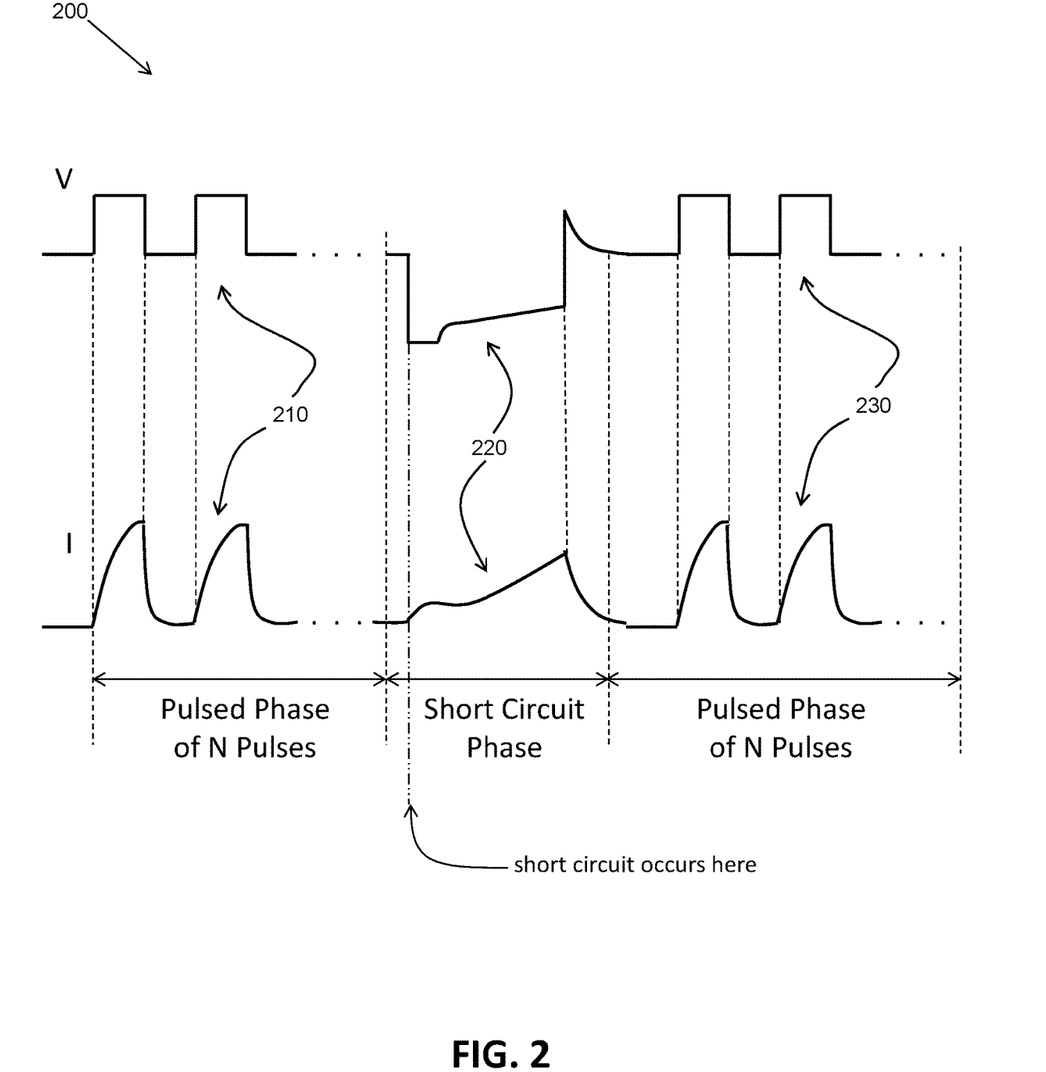
FIG. 2 illustrates one embodiment of a voltage and current welding output produced by the pulsed arc welding system of FIG. 1.

FIG. 2 illustrates one embodiment of a voltage (V) and current (I) welding output 200 produced by the pulsed arc welding system 100 of FIG. 1 during a pulsed arc welding process. Referring to FIG. 1 and FIG. 2, the waveform generator 116 generates a pulsed welding waveform and the power supply (e.g., the power conversion unit 112 and the output inverter 114) generates the welding output 200 in response to the pulsed welding waveform. The welding output 200 is applied to the welding wire electrode E (via a contact tip of the welding gun/torch 130) and the workpiece W, for example, to form an arc A between an end of the welding wire electrode E and the workpiece W as the wire feeder 150 feeds the welding wire electrode through the welding gun/torch 130. In one embodiment, the controller 118 controls the operation of the waveform generator 116, the power supply (e.g., the power conversion unit 112 and the output inverter 114), and the wire feeder 150 during the pulsed arc welding process.

As shown in FIG. 2, the welding output 200 includes a pulsed phase having a series 210 of a determined number N of welding output pulses followed by a short circuit phase. The phases are repeated in an alternating manner during a pulsed arc welding process, in accordance with one embodiment. Each pulse of the determined number N of welding output pulses in the series 210 causes a molten metal ball or droplet to form on the tip of the welding wire electrode E and transfer across the arc from the electrode E to the workpiece W. The droplet transfer takes place across the arc without the electrode E shorting to the workpiece W, in accordance with one embodiment. The determined number N of welding output pulses may be, for example, in the range of 30 pulses to 40 pulses. However, other ranges are possible as well.

For a given pulsed phase, once the determined number N of welding output pulses are output, generation of the N pulses stops, but the welding wire electrode E is allowed to continue to feed toward the workpiece W at a same wire feed speed in an attempt to electrically short to the workpiece W. A short circuit phase is entered and an attempt is made to confirm that the welding wire electrode E has indeed electrically shorted to the workpiece W within a determined error time period $T_{error}$ since having stopped outputting the N pulses. For example, in one embodiment, the voltage feedback circuit 122 (part of a voltage sensing configuration electrically connected to the gun 130 and the workpiece W) monitors the welding output voltage and provides an indication of the welding output voltage to the controller 118. When the welding output voltage drops below a defined threshold level (e.g., <10 volts), the controller 118 "knows" that (and when) an electrical short has occurred (see "short circuit occurs here" in FIG. 2). The controller 118 determines if the electrical short has occurred within $T_{error}$. If the electrical short has not occurred within $T_{error}$, then the controller 118 expresses a system fault and shuts down the pulsed arc welding system 100, in accordance with one embodiment. That is, the controller 118 assumes that the welding wire electrode E has stopped feeding properly due to, for example, tangling ("bird nesting") and, therefore, was not able to traverse downward and short to the workpiece W. $T_{error}$ may be in the range of, for example, 120 milliseconds to 1200 milliseconds. However, other ranges are possible as well.

If the electrical short has occurred within $T_{error}$, then the short circuit phase is continued and the system 100 generates a short circuit phase voltage and current output 220 as part of the welding output 200 (i.e., a short circuit welding output power waveform is applied to the welding wire electrode E and the workpiece W), for example, in an attempt to clear the short. Subsequently, a next series 230 of the determined number N of welding output pulses is generated and output. The process repeats until a system fault is expressed (e.g., when the welding wire electrode E gets tangled) or until the welding task is completed.

In accordance with other embodiments, other ways of verifying that the welding wire electrode E has shorted to the workpiece W may be employed. For example, in one embodiment, indications of both the welding output voltage (as monitored by the voltage feedback circuit 122) and the welding output current (as monitored by the current feedback circuit 120) may be used in combination to determine whether or not an electrical short has occurred. In another embodiment, the welding output voltage may not be used but the welding output current may be used to determine whether or not an electrical short has occurred. In one embodiment, the current feedback circuit 120 is part of a current sensing configuration, which includes a current shunt 121, and is electrically connected to the gun 130. Other ways of determining a short may be possible as well, in accordance with other embodiments.

Figure 3:
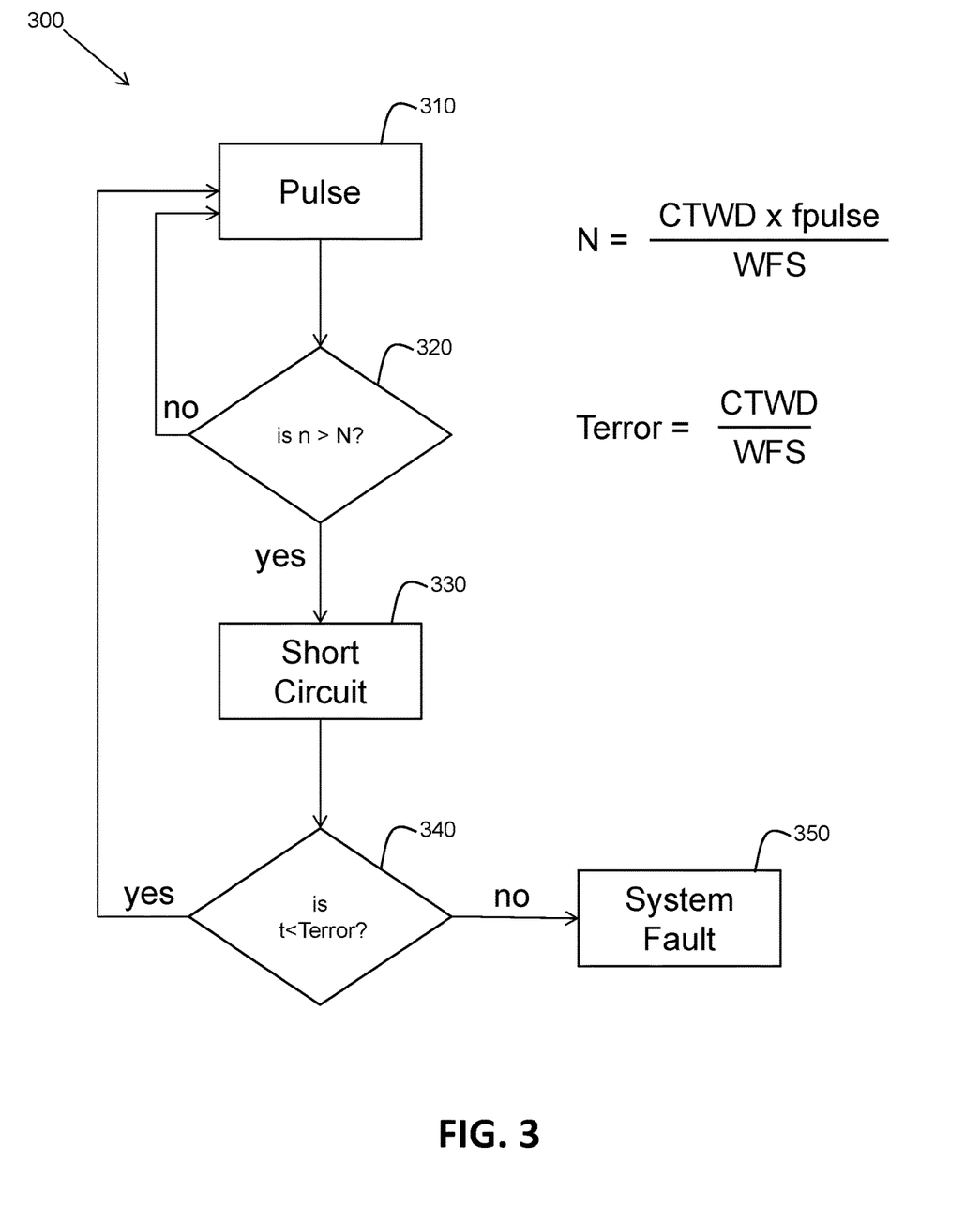
FIG. 3 illustrates a flowchart of one embodiment of a method performed by the pulsed arc welding system of FIG. 1.

FIG. 3 illustrates a flowchart of one embodiment of a method 300 performed by the pulsed arc welding system 100 of FIG. 1. Referring to FIG. 1, FIG. 2, and FIG. 3, at block 310 of the method 300, a welding output pulse (of a present series 210 of N welding output pulses) is generated and output during the pulsed phase to form and transfer a molten metal droplet across the arc from the tip of the welding wire electrode E to the workpiece W. In one embodiment, the controller 118 keeps count of the number of welding output pulses n in the series 210 that have been generated and output. At block 320, a check is performed (e.g., by the controller 118) to determine if all N welding output pulses for the present series 210 have been generated and output (e.g., is n>N?). If not, the method 300 reverts back to block 310 to generate and output a next welding output pulse. In this manner, all N welding output pulses are generated and output in the series 210.

Once all N welding output pulses are output, the method 300 proceeds from block 320 to block 330 where the short circuit phase is entered. During the short circuit phase, the controller 118 is waiting for an indication that a short circuit has occurred (e.g., from the voltage feedback circuit 122). For example, a measurement of one volt or less from the voltage feedback circuit 122 may be an indication to the controller 118 (e.g., when comparing to a threshold value) that a short circuit has occurred. If the controller 118 receives an indication of a short at a time t since stopping the N welding output pulses, then at block 340 the controller 118 compares the time t to $T_{error}$ (the determined error time period).

If $t \leq T_{error}$, then the short circuit phase of the method is continued by generating and outputting a short circuit phase voltage and current output 220, for example, in an attempt to clear the short. That is, a short circuit welding output power waveform is applied to the welding wire electrode E and the workpiece W. Subsequently, the method 300 reverts back to block 310 to begin generating and outputting the next series 230 of N welding output pulses. In this manner, as long as the welding wire electrode E keeps properly feeding during the pulsed arc welding process, successive series of N welding output pulses are generated and output, between short circuit phases, to complete a welding task.

However, if the welding wire electrode E has stopped feeding (e.g., due to tangling), then a short may not occur at all. If a short is not indicated within $T_{error}$, then at block 350 the controller 118 expresses a system fault and shuts down the pulsed arc welding system 100 to avoid damaging the contact tip (and any other parts) of the welding gun/torch 130. That is, the system 100 does not begin generating and outputting a next series of N welding output pulses because, otherwise, the welding electrode wire W could burn back all the way to the welding gun/torch, causing damage (e.g., melting the contact tip or diffuser).

Referring to FIG. 3, the determined number N of welding output pulses is calculated (e.g., by the controller 118 of the welding power source 110) as:

$$N = (CTWD \times f_{pulse}) / WFS.$$

CTWD is the desired or set contact tip to work distance (e.g., as controlled by the robotic subsystem 160).

$f_{pulse}$ is the frequency of repetition of the welding output pulses during the pulsed phase.

WFS is the wire feed speed of the welding wire electrode E as fed by the wire feeder 150.

In this manner, the number of welding output pulses for a single pulsed phase is limited to N pulses, which is the number of pulses required to burn a tangled welding electrode wire W from the workpiece back to the contact tip when feeding has stopped. In accordance with other embodiments, the robotic subsystem 160 or the wire feeder 150 is configured to calculate the determined number N of welding output pulses.

Referring to FIG. 3, $T_{error}$ is calculated (e.g., by the controller 118 of the welding power source 110) as:

$$T_{error} = CTWD / WFS.$$

In this manner, $T_{error}$ is the time it takes a point on the welding wire electrode E, when being fed at the wire feed speed, to go from the contact tip to the workpiece. In accordance with other embodiments, the robotic subsystem 160 or the wire feeder 150 is configured to calculate $T_{error}$.

Therefore, by employing the process (algorithm) of FIG. 3, a maximum amount of the welding wire electrode E can be deposited during a pulsed phase before going to the short circuit phase to check that an electrical short has occurred (i.e., that the welding wire electrode E is still feeding) without causing damage to the welding gun/torch 130. Other ways of calculating or setting CTWD and $T_{error}$ are possible as well, in accordance with other embodiments.

In accordance with other embodiments, the wire feed speed (WFS) may be synchronized to the phases (e.g., by the controller 118). For example, in one embodiment, the WFS is slower during the short circuit phase and faster during the pulsed phase. For example, the WFS may be 400 inches per minute during the pulsed phase and 200 inches per minute during the short circuit phase. As a result, the chance of stubbing or spatter would be lessened during the short circuit phase. In accordance with still other embodiments, the transitions between the phases may be improved with synchronized wire feeding. For example, feeding of the welding wire electrode E may be stopped during a first time period at the end of the short circuit phase to allow the arc to grow back to the proper length for pulsed welding. Furthermore, the wire feed speed (WFS) may be sped up (briefly) at the end of the pulsed phase during a second time period to reduce the time period for $T_{error}$. In these ways, the pulsed arc welding process may be improved.

Figure 4:
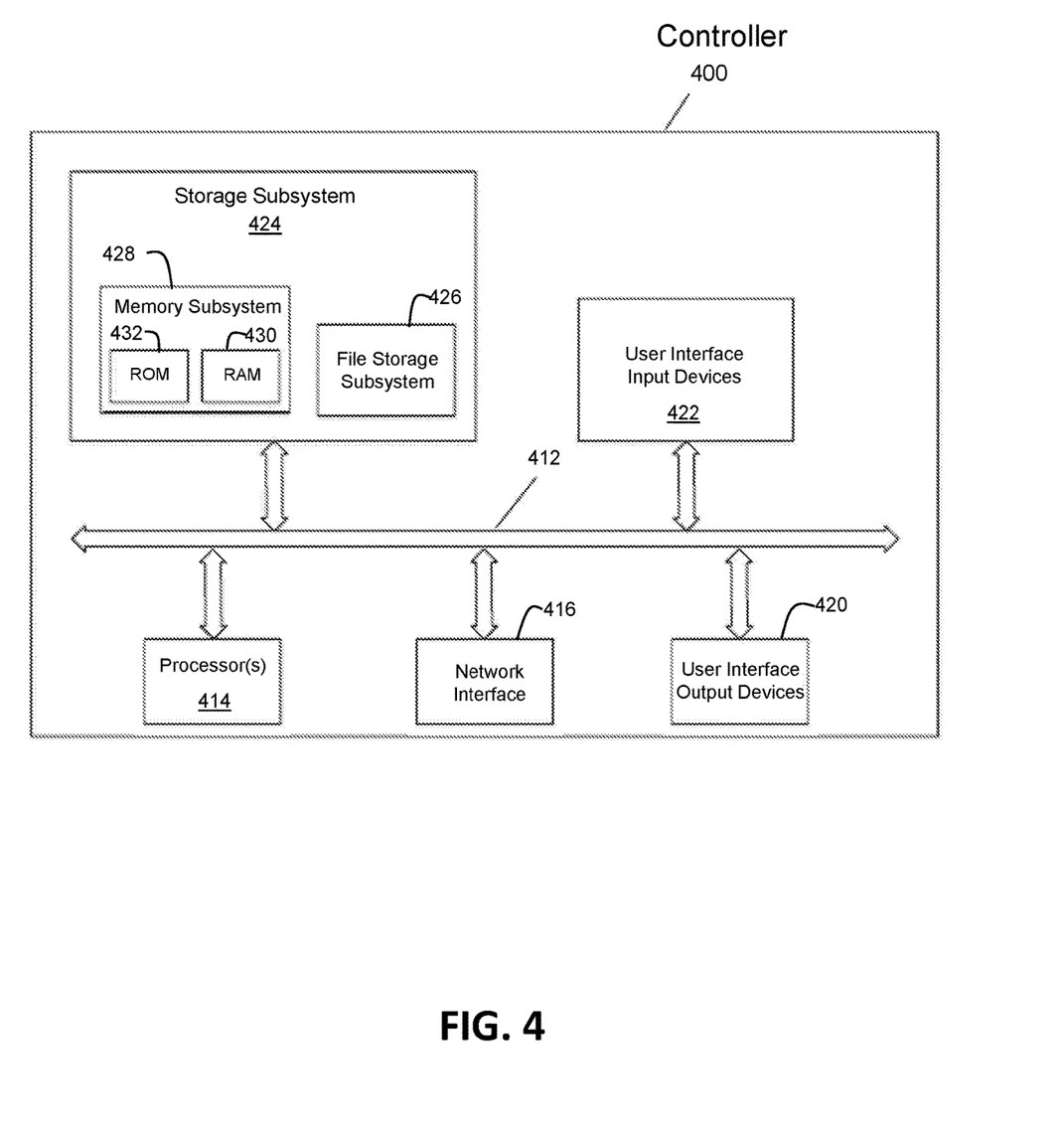
FIG. 4 illustrates an example embodiment of a controller (e.g., a controller of the pulsed arc welding system of FIG. 1).

FIG. 4 illustrates an example embodiment of a controller 400. One or more elements of the controller 400 may be used to configure, for example, the controller 118 of FIG. 1 (or a robotic controller of the robotic subsystem 160 of FIG. 1) as described herein. The controller 400 includes at least one processor 414 which communicates with a number of peripheral devices via bus subsystem 412. These peripheral devices may include a storage subsystem 424, including, for example, a memory subsystem 428 and a file storage subsystem 426, user interface input devices 422, user interface output devices 420, and a network interface subsystem 416. The input and output devices allow user interaction with the controller 400. Network interface subsystem 416 provides an interface to outside networks and is coupled to corresponding interface devices in other computer systems. For example, the controller 118 of the welding power source 110 of FIG. 1 may share one or more characteristics with the controller 400 and may be, for example, a conventional computer, a digital signal processor, and/or other computing device.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information (e.g., a user selected contact tip to work distance (CTWD) and a user selected wire feed speed (WFS)) into the controller 400 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 400 to the user or to another machine or computer system.

Storage subsystem 424 stores programming and data constructs that provide or support some or all of the functionality described herein (e.g., as software modules). For example, the storage subsystem 424 may include software modules that are used in a controller to control the welding system 100 of FIG. 1.

Software modules are generally executed by processor 414 alone or in combination with other processors. Memory 428 used in the storage subsystem can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 426 in the storage subsystem 424, or in other machines accessible by the processor(s) 414.

Bus subsystem 412 provides a mechanism for letting the various components and subsystems of the controller 400 communicate with each other as intended. Although bus subsystem 412 is shown schematically as a single bus, alternative embodiments of the bus subsystem may use multiple buses.

The controller 400 can be of varying types including a workstation, server, computing cluster, blade server, server farm, or any other data processing system or computing device. Due to the ever-changing nature of computing devices and networks, the description of the controller 400 depicted in FIG. 4 is intended only as a specific example for purposes of illustrating some embodiments. Many other configurations of the controller 400 are possible having more or fewer components than the controller depicted in FIG. 4.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A pulsed arc welding system, comprising:
   a welding gun having a contact tip;
   a waveform generator configured to generate a pulsed welding waveform;
   a power supply configured to generate a determined number of welding output pulses in response to the pulsed welding waveform;
   a wire feeder configured to feed a welding wire electrode toward a workpiece through the welding gun; and
   a controller, having at least one processor, programmed to control operation of the waveform generator, the power supply, and the wire feeder during a pulsed welding operation to mitigate damage to the welding gun due to tangling of the welding wire electrode by:
   (a) having the waveform generator generate the pulsed welding waveform and having the power supply generate and output a series of the determined number of welding output pulses based on the pulsed welding waveform, as calculated by the controller, to form an arc between the welding wire electrode and the workpiece as the welding wire electrode is fed toward the workpiece by the wire feeder,
   (b) having the power supply stop generating the determined number of welding output pulses after generating and outputting the determined number of welding output pulses while allowing the welding wire electrode to continue to be fed toward the workpiece in an attempt to electrically short to the workpiece;
   (c) the controller attempting to confirm that the welding wire electrode has electrically shorted to the workpiece within a determined error time period, as calculated by the controller, after stopping generation of the determined number of welding output pulses, by the controller processing feedback information related to at least one of a welding output voltage and a welding output current received from the power supply, and (d) repeating steps (a) through (c) if electrical shorting of the welding wire electrode has been confirmed within the determined error time period, else
the controller shutting down the pulsed arc welding system to mitigate damaging the welding gun.

2. The system of claim 1, further comprising at least one of a voltage feedback circuit, configured to sense and provide an indication of the welding output voltage to the controller as the feedback information, or a current feedback circuit, configured to sense and provide an indication of the welding output current to the controller as the feedback information, wherein the controller is configured to process at least one of the indication of the welding output voltage or the indication of the welding output current in the attempt to confirm that the welding wire electrode has electrically shorted to the workpiece.

3. The system of claim 1, wherein the controller is configured to calculate the determined number of welding output pulses based on a contact tip to work distance (CTWD), a frequency of the determined number of welding output pulses ($f_{pulse}$), and a wire feed speed (WFS).

4. The system of claim 1, wherein the controller is configured to calculate the determined error time period based on a contact tip to work distance (CTWD) and a wire feed speed (WFS).

5. The system of claim 1, wherein the power supply includes at least a power conversion unit and an output inverter circuit.

6. The system of claim 1, wherein the power supply includes at least a power conversion unit and an output chopper circuit.

7. The system of claim 1, wherein the welding wire electrode is made of at least one of aluminum, copper, or silicon bronze.

8. The system of claim 1, wherein the determined number of welding output pulses is in the range of 30 pulses to 40 pulses during a pulsed phase of the pulsed welding waveform.

9. The system of claim 1, further comprising a robotic subsystem configured to control movement of the welding gun across the workpiece while maintaining a set contact tip to work distance (CTWD).

10. The system of claim 1, wherein the controller is configured to control the waveform generator, the power supply, and the wire feeder to generate a short circuit welding output power waveform that is applied to the welding wire electrode and the workpiece after the electrical shorting of the welding wire electrode has been confirmed and before repeating steps (a) through (c).

11. The system of claim 1, wherein the determined error time period is in the range of 120 milliseconds to 1200 milliseconds.

12. The system of claim 1, wherein the pulsed welding operation includes pulsed phases and short circuit phases, and wherein the controller is configured to control a wire feed speed (WFS) of the wire feeder, where the WFS during the short circuit phases is less than the WFS during the pulsed phases.

13. The system of claim 1, wherein the pulsed welding operation includes alternating pulsed phases and short circuit phases, and wherein the controller is configured to control the wire feeder to:
stop feeding of the welding wire electrode during a first time period at an end of the short circuit phases; and
increase a wire feed speed (WFS) of the welding wire electrode during a second time period at an end of the pulsed phases.

14. A robotic welding system, comprising:
a robotic subsystem configured to control movement of a welding torch, having a contact tip, across a workpiece while maintaining a set contact tip to work distance (CTWD) during a pulsed welding operation;
a wire feeder configured to feed a welding wire electrode toward the workpiece through the welding torch during the pulsed welding operation; and
a welding power source operatively connected to the robotic subsystem and the wire feeder, the welding power source configured to:
(a) generate and output a series of a determined number of welding output pulses to form an arc between the welding wire electrode and the workpiece as the welding wire electrode is fed toward the workpiece during the pulsed welding operation,
(b) stop generating welding output pulses after generating and outputting the series of the determined number of welding output pulses while allowing the welding wire electrode to continue to be fed toward the workpiece in an attempt to electrically short to the workpiece during the pulsed welding operation,
(c) attempt to confirm that the welding wire electrode has electrically shorted to the workpiece within a determined error time period after stopping generation of the welding output pulses during the pulsed welding operation, and
(d) repeat steps (a) through (c) if electrical shorting of the welding wire electrode has been confirmed within the determined error time period, else
express a system fault and shut down the robotic welding system to avoid damaging the welding torch.

15. The system of claim 14, wherein the welding power source includes:
a waveform generator configured to generate a pulsed welding waveform;
a power supply configured to generate the determined number of welding output pulses in response to the pulsed welding waveform; and
a controller configured to control operation of the waveform generator, the power supply, and the wire feeder during the pulsed welding operation.

16. The system of claim 14, comprising at least one of a voltage sensing configuration to sense a welding output voltage or a current sensing configuration to sense a welding output current, wherein the welding power source is configured to use at least one of an indication of the welding output voltage or an indication of the welding output current in the attempt to confirm that the welding wire electrode has electrically shorted to the workpiece.

17. The system of claim 14, wherein at least one of the robotic subsystem, the wire feeder, or the welding power source is configured to calculate the determined number of welding output pulses based on the set contact tip to work distance (CTWD), a frequency of the determined number of output pulses ($f_{pulse}$), and a wire feed speed (WFS).

18. The system of claim 14, wherein at least one of the robotic subsystem, the wire feeder, or the welding power source is configured to calculate the determined error time period based on the set contact tip to work distance (CTWD) and a wire feed speed (WFS).

19. The system of claim 14, wherein the welding wire electrode is made of at least one of aluminum, copper, or silicon bronze.

20. The system of claim 14, wherein the determined number of welding output pulses is in the range of 30 pulses to 40 pulses.

21. The system of claim 14, wherein the welding power source is configured to generate a short circuit welding output power waveform that is applied to the welding wire electrode and the workpiece after the electrical shorting of the welding wire electrode has been confirmed and before repeating steps (a) through (c).

22. The system of claim 14, wherein the determined error time period is in the range of 120 milliseconds to 1200 milliseconds.

* * * * *